Jan 6, 1931.  H. E. WILLIAMS  1,787,845
SUN AND RAIN SHIELD FOR VEHICLES
Filed Nov. 8, 1926
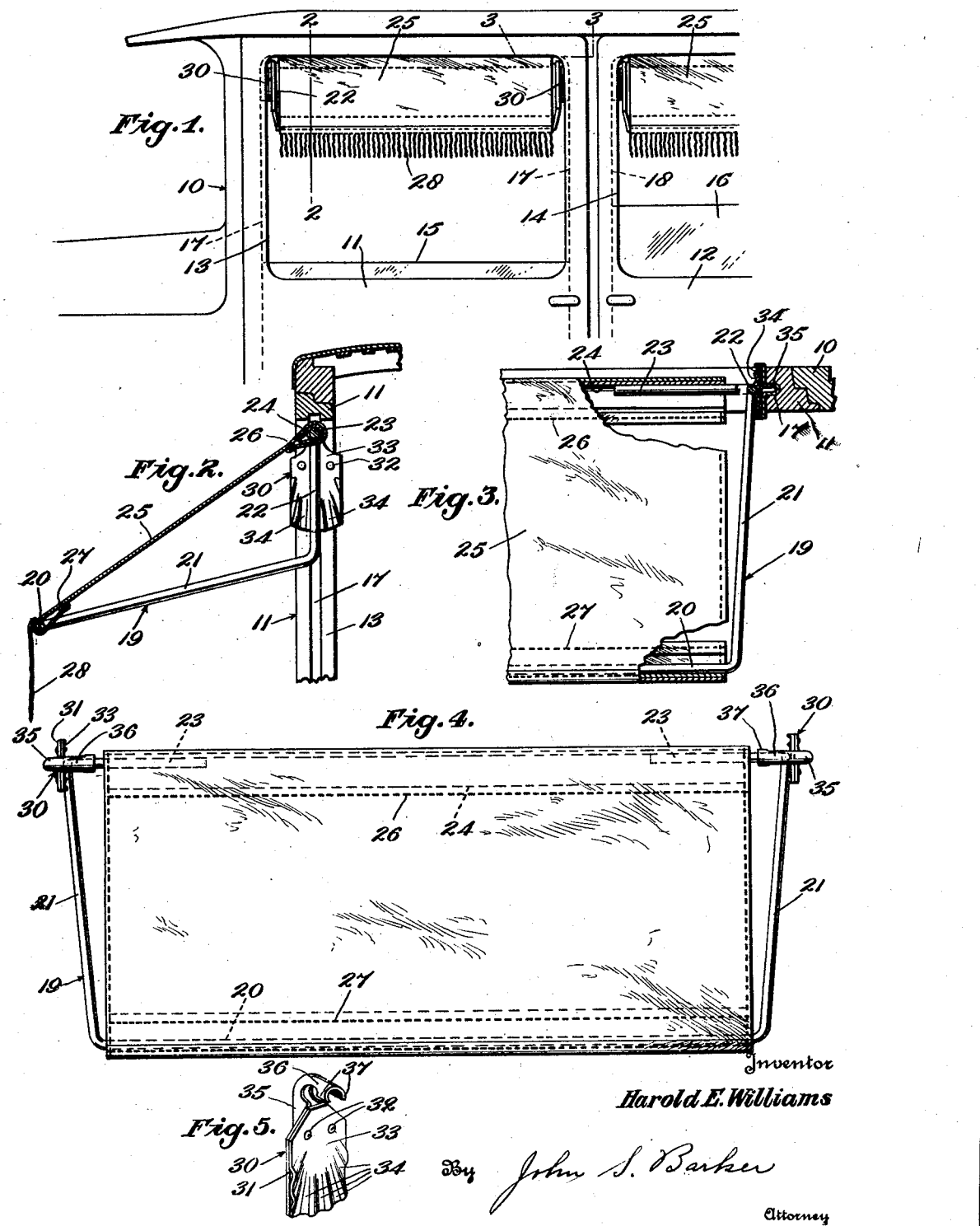
Inventor
Harold E. Williams
By John S. Barker
Attorney Patented Jan. 6, 1931

1,787,845

UNITED STATES PATENT OFFICE

HAROLD E. WILLIAMS, OF CARTHAGE, MISSOURI

SUN AND RAIN SHIELD FOR VEHICLES

Application filed November 8, 1926. Serial No. 146,994.

This invention relates to sun and rain shields for vehicles and has for one of its objects to provide a device of this character which will be simple in construction, comparatively inexpensive to manufacture and more efficient in use than those which have been heretofore proposed.

In my copending application filed August 23, 1926, Serial Number 131,081, entitled "Awnings", I have described and claimed a sun and rain shield for automobiles which is resiliently and frictionally mounted in the glass runs of an automobile door or window. In this said application, however, the shield, while being vertically adjustable in the said glass run, is otherwise rigid. In contrast thereto, the present invention has for its primary object, the provision of a sun and rain shield of this character which while being frictionally mounted in the window opening or the glass run and vertically adjustable therein, is at the same time susceptible of angular adjustment whereby it may be lowered to a substantially vertical position to protect the occupants of the vehicle from wind or rain in inclement weather, and may also be raised to a substantially horizontal position out of the line of vision in clear weather.

With the above and other objects in view which will appear as the description proceeds, the invention consists in the novel details of construction and combinations of parts more fully hereinafter described and particularly pointed out in the appended claims.

Referring to the acompanying drawings forming a part of this specification in which like reference characters designate like parts in all the views:

Figure 1 is a side elevational view of a portion of a vehicle body of the closed type showing the present invention applied thereto;

Fig. 2 is an enlarged vertical sectional view taken approximately on the plane indicated by the line 2—2 of Fig. 1;

Fig. 3 is a fragmentary plan view partially in section, taken approximately on the plane indicated by the line 3—3 of Fig. 1;

Fig. 4 is a top plan view of the shade detached from the vehicle; and,

Fig. 5 is a detailed perspective view of one of the supporting brackets.

Referring more particularly to the said drawings, the numeral 10 indicates generally a vehicle body of the closed type which is provided with the usual doors 11 and 12 having openings 13 and 14 respectively, which may be closed by the usual panes of glass 15 and 16 slidably mounted in the usual grooves or glass runs 17 and 18.

The sun and rain shield proper comprises a frame 19 which is preferably formed of a rod or metal tube bent to substantially U-shape when viewed in plan to provide a front portion 20 and side portions or arms 21 integral therewith and normally occupying substantially horizontal planes. The said side arms 21 at the rear, are bent upwardly to form the substantially vertical portions 22 and then inwardly to provide the inturned ends 23. The said inturned ends 23 are slidably received within a hollow tubular member 24 which, as will be clear from Fig. 2, is substantially pear shape in cross section and which constitutes the fourth side of the substantially rectangular frame. A shade member 25 of canvas or other suitable material has one edge looped around the member 24 and secured as by stitching 26 while its opposite edge is looped around the front member 20 and secured by stitching 27. The front edge of the member 25 may be provided with suitable fringe or other ornamental material 28.

As thus far described, the construction is quite similar to that disclosed in my said copending application #131,081, except that the side arms or portions 21 are of slightly different shape. In order to provide for the mounting of the frame in the glass run of the vehicle door and at the same time to provide for the pivotal adjustment of the shield, in the present instance there is provided a pair of brackets 30 which are here shown as formed of sheet metal although obviously, they may be constructed in other ways. In the present instance, these said brackets are shown as comprising a metallic sheet metal plate 31 to which is secured as by rivets or other suitable fastening means 32, a second plate 33 which latter plate is stamped to provide a plurality of radiating corrugations or ribs 34. The plate 31 is stamped to provide a single medial rib or corrugation 35 which in the normal position of the parts, is slidably mounted in a glass run such as 17, of a vehicle door, as will be clear from Figs. 1 and 3 of the drawings. The corrugated or rib portion 35 of the plate 31 is extended upwardly and bent at substantially right angles to provide an inturned gripping member 36 which as will be clear from Fig. 5, is formed with a pair of gripping ears 37 which are adapted to embrace the inturned ends 23 of the frame. These ears, as will be readily understood, are bent around the said portion 23 during assembly of parts and serve to pivotally connect the frame and brackets with the substantially vertical portions 22 of the frame in cooperative relation with the ribs or corrugations 34 of the bracket plate 33. In other words, when the parts are positioned as shown in Figs. 1, 2 and 3, with the ribs 35 of the brackets 30 in the glass runs such as 17, the frame 19 may be angularly adjusted through pivotal movement of the inturned ends 23 within the inturned portions 36 of the brackets and the said frame will be held in any desired angular position due to the frictional engagement of the vertical arms 22 with the corrugations 34. The natural resilience of the horizontal arms 21 of the frame will yieldingly maintain the vertical portions 22 in engagement with the said corrugations. This said resilience likewise permits of the arms 21 being sprung inwardly to permit the ready engagement and disengagement of the ribs 35 of the brackets 30 in the glass run such as 17.

It will thus be seen that the present invention provides a sun and rain shield for vehicle doors which not only may be readily detachably and slidably mounted in the glass run in the door but also that the shield is capable of pivotal adjustment whereby the canvas portion 25 thereof may be raised and lowered to accommodate itself to varying weather conditions.

While one form of the invention has been thus illustrated and described, it is obvious that those skilled in the art may vary the details of construction as well as the precise arrangement of parts without departing from the spirit of the invention and therefore, it is not wished to be limited to the above disclosure except as may be required by the claims.

What is claimed is:

1. A sun and rail shield of the class described comprising a frame and a cover secured thereto, said frame having resilient portions; and supporting means for said frame pivotally connected to said portions, and adapted to be urged thereby into frictional engagement with the walls of a window opening, said means having portions coacting with said frame to maintain the latter in varying angular positions.

2. In a sun and rain shield of the class described, a frame having side arms provided with upwardly extending rear portions and inwardly turned extremities; a cover secured to said frame; and brackets pivotally carrying said inturned extremities, and adapted to readily detachably engage the walls of a window opening, said brackets being provided with corrugations engageable by said upwardly extending portions of said arms to maintain said frame in varying angular positions.

3. In a sun and rain shield of the class described, a frame having resilient side arms having upwardly extending rear portions and inwardly turned extremities; a cover secured to said frame; and brackets for pivotally mounting said frame in a window opening, said brackets having angular extensions embracing the inturned extremities of said frame and affording pivotal connection therewith.

4. In a sun and rain shield of the class described, a frame having resilient side arms having upwardly extending rear portions and inwardly turned extremities; a cover secured to said frame; and brackets for pivotally mounting said frame in a window opening, said brackets having angular extensions embracing the inturned extremities of said frame and affording pivotal connection therewith, said brackets also having laterally extending ribs adapted to enter the glass run of said window opening.

5. In a sun and rain shield of the class described, a frame having resilient side arms having upwardly extending rear portions and inwardly turned extremities; a cover secured to said frame; and brackets for pivotally mounting said frame in a window opening, said brackets having angular extensions embracing the inturned extremities of said frame and affording pivotal connection therewith, said brackets also having laterally extending ribs adapted to enter the glass run of said window opening, and said brackets being further provided with radiating corrugations engageable by said upwardly extending portions of said frame arms to maintain said frame in varying angular positions.

6. A non-collapsible sun and rain shield adapted to be applied to a window opening of a vehicle, comprising a cover and a supporting frame therefor, and means adapted for engagement with the frame of a window opening to frictionally support the shield, the shield and supporting means being pivotally connected and arranged to coact one with another to maintain the shield in varying angular positions to which it may be set.

7. A sun and rain shield comprising a substantially U-shaped supporting frame, the side arms of which are laterally elastic adapting the frame to be applied to openings of different widths, the ends of such arms being inturned; a cover supported on the said frame, and a pair of supporting brackets formed with external ribs adapted to enter the glass runs of a window frame and with inturned gripping members whereby the brackets are pivotally united with the inturned ends of the side arms of the supporting frame.

HAROLD E. WILLIAMS.